United States Patent
Di Censo et al.

(10) Patent No.: US 9,720,591 B2
(45) Date of Patent: Aug. 1, 2017

(54) MULTITOUCH CHORDING LANGUAGE

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/464,532

(22) Filed: Aug. 20, 2014

(65) Prior Publication Data

US 2016/0054914 A1 Feb. 25, 2016

(51) Int. Cl.
| | |
|---|---|
| G06F 3/041 | (2006.01) |
| G06F 3/048 | (2013.01) |
| G06F 3/0488 | (2013.01) |
| G06F 3/01 | (2006.01) |
| B62D 1/04 | (2006.01) |

(Continued)

(52) U.S. Cl.
CPC ......... *G06F 3/04883* (2013.01); *B62D 1/046* (2013.01); *G06F 3/017* (2013.01); *G06F 3/0235* (2013.01); *G06F 3/0414* (2013.01); *G06F 3/0416* (2013.01); *G06F 3/04847* (2013.01); *G06F 3/04886* (2013.01); *G06F 2203/04104* (2013.01); *G06F 2203/04808* (2013.01)

(58) Field of Classification Search
CPC .................. G06F 3/038; G06F 3/0488; G06F 2203/048093
USPC ........................................................ 345/173
See application file for complete search history.

(56) References Cited

U.S. PATENT DOCUMENTS

| 6,768,962 B2 | 7/2004 | Bullinger |
|---|---|---|
| 7,987,030 B2 | 7/2011 | Flores |

(Continued)

FOREIGN PATENT DOCUMENTS

| JP | 2001-246994 A | 9/2001 |
|---|---|---|
| KR | 10-2013-0090965 A | 8/2013 |
| KR | 10-1328441 B1 | 11/2013 |

OTHER PUBLICATIONS

International Search Report dated Nov. 13, 2015 in Application No. PCT/US2015/043338.

(Continued)

*Primary Examiner* — Ariel Balaoing
(74) *Attorney, Agent, or Firm* — Artegis Law Group, LLP

(57) ABSTRACT

A multitouch interface application provides a user with access to a multitouch chording language for controlling auxiliary components within a vehicle, where a particular command for a given auxiliary component is specified by a combination of a left-hand gesture and a right-hand gesture. The multitouch interface application receives left-hand gestures from a left-hand touch sensing surface, where a given left-hand gesture corresponds to a selection of mode associated within a given auxiliary component. The multitouch interface application also receives right-hand gestures from a right-hand touch sensing surface, where a given right-hand gesture, in conjunction with a left-hand gesture, corresponds to a command for the given auxiliary component. Upon receiving both a left-hand gesture and a right-hand gesture, the multitouch interface application issues the command to the auxiliary component associated with the selected mode.

21 Claims, 10 Drawing Sheets

(51) Int. Cl.
G06F 3/0484 (2013.01)
G06F 3/023 (2006.01)

(56) References Cited

U.S. PATENT DOCUMENTS

| | | | |
|---|---|---|---|
| 2006/0047386 A1* | 3/2006 | Kanevsky | B60K 35/00 |
| | | | 701/36 |
| 2008/0071177 A1 | 3/2008 | Yanagidaira | |
| 2011/0169750 A1 | 7/2011 | Pivonka et al. | |
| 2012/0068946 A1 | 3/2012 | Tang | |
| 2012/0179328 A1 | 7/2012 | Goldman-Shenhar | |
| 2013/0050114 A1* | 2/2013 | Backman | B60K 37/06 |
| | | | 345/173 |

OTHER PUBLICATIONS

Non-Final Office Action U.S. Appl. No. 14/563,961, dated Oct. 19, 2015, 6 pages.

* cited by examiner

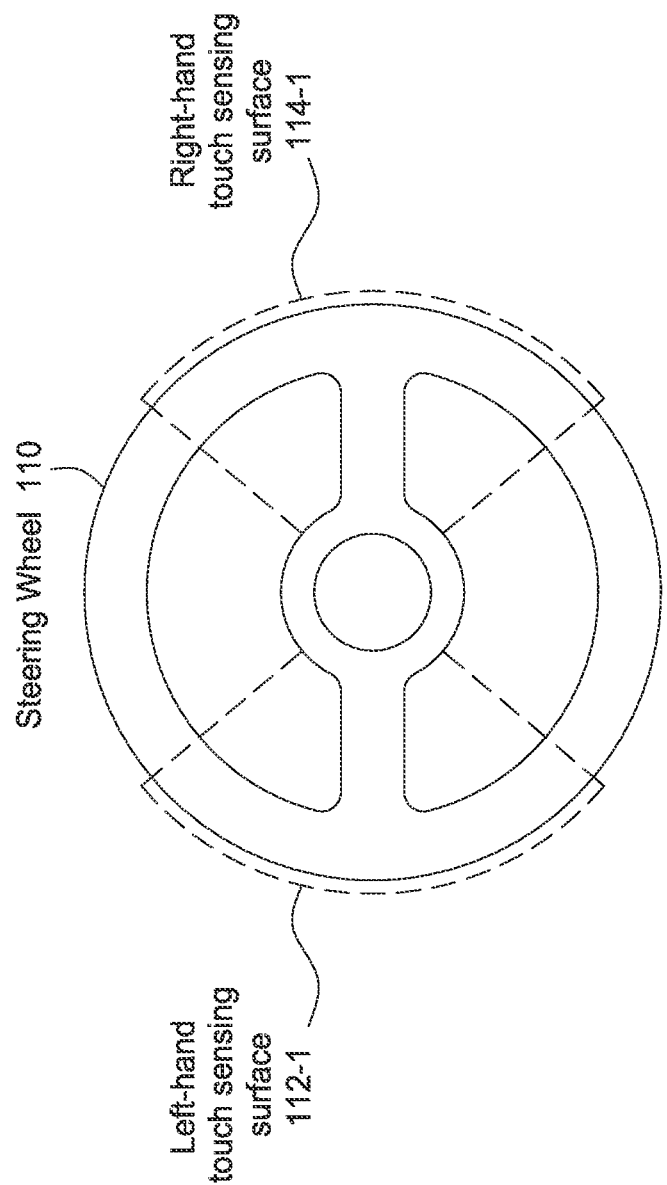

MULTITOUCH CHORDING LANGUAGE

BACKGROUND

Field of the Embodiments of the Invention

Embodiments of the present invention relate generally to human-vehicle interfaces, and, more specifically, to a multitouch chording language.

Description of the Related Art

A modern vehicle typically includes a steering wheel with a collection of fixed-function buttons for controlling various auxiliary components within the vehicle. For example, a conventional steering wheel could include volume buttons for increasing and decreasing the volume of the stereo system. The set of buttons placed on the steering wheel usually provides access to a limited subset of the functions that the driver may wish to perform. In particular, most modern steering wheels only provide controls related to the stereo system and cruise control. These limitations arise from the fact that the steering wheel provides limited area on which to place fixed-function buttons.

One problem with the approach described above is that the driver of the vehicle is required to remove at least one hand from the steering wheel in order to control any auxiliary components that lack corresponding buttons on the steering wheel. For example, since conventional steering wheels usually do not include buttons related to climate control, the driver must remove one of their hands from the steering wheel in order to adjust the temperature, fan speed, air conditioner (A/C), and so forth. This arrangement is problematic because the driver must divert focus away from the act of driving in order to interact with certain auxiliary components. Consequently, the ability of the driver to control the vehicle may be reduced, thereby diminishing the safety of the driver and other occupants of the vehicle.

As the foregoing illustrates, a typical steering wheel includes fixed-function buttons for controlling only a subset of the auxiliary components in the vehicle. Consequently, the driver is required to divert attention away from driving in order to access the other auxiliary components, potentially reducing the ability of the driver to safely operate the vehicle.

SUMMARY

One or more embodiments set forth include a non-transitory computer-readable medium storing program instructions that, when executed by a processing unit, cause the processing unit to control the operation of a plurality of auxiliary components within a vehicle, by performing the steps of receiving, via a first touch sensing surface, a first input gesture, translating, based on a mode map, the first input gesture into a selection of a first mode corresponding to a first auxiliary component included in the plurality of auxiliary components, receiving, via a second touch sensing surface, a second input gesture, and translating, based on a command mapping, the second input gesture into a first command that relates to the operation of the first auxiliary component, wherein the first command is transmitted to the first auxiliary component.

At least one advantage of the techniques set forth herein is that the driver of the vehicle need not remove either hand from the steering wheel in order to adjust the operation of auxiliary components within the vehicle, thereby improving driver safety. In addition, the driver can interact with those auxiliary components without averting visual focus, further improving driver safety. With these techniques, vehicle accidents due to driver distraction may be reduced.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the invention subsumes other embodiments as well.

FIGS. 2A-2B illustrate exemplary configurations of a left-hand touch sensing surface and a right-hand touch sensing surface included within the steering wheel of FIG. 1, according to various embodiments;

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Figure 1:
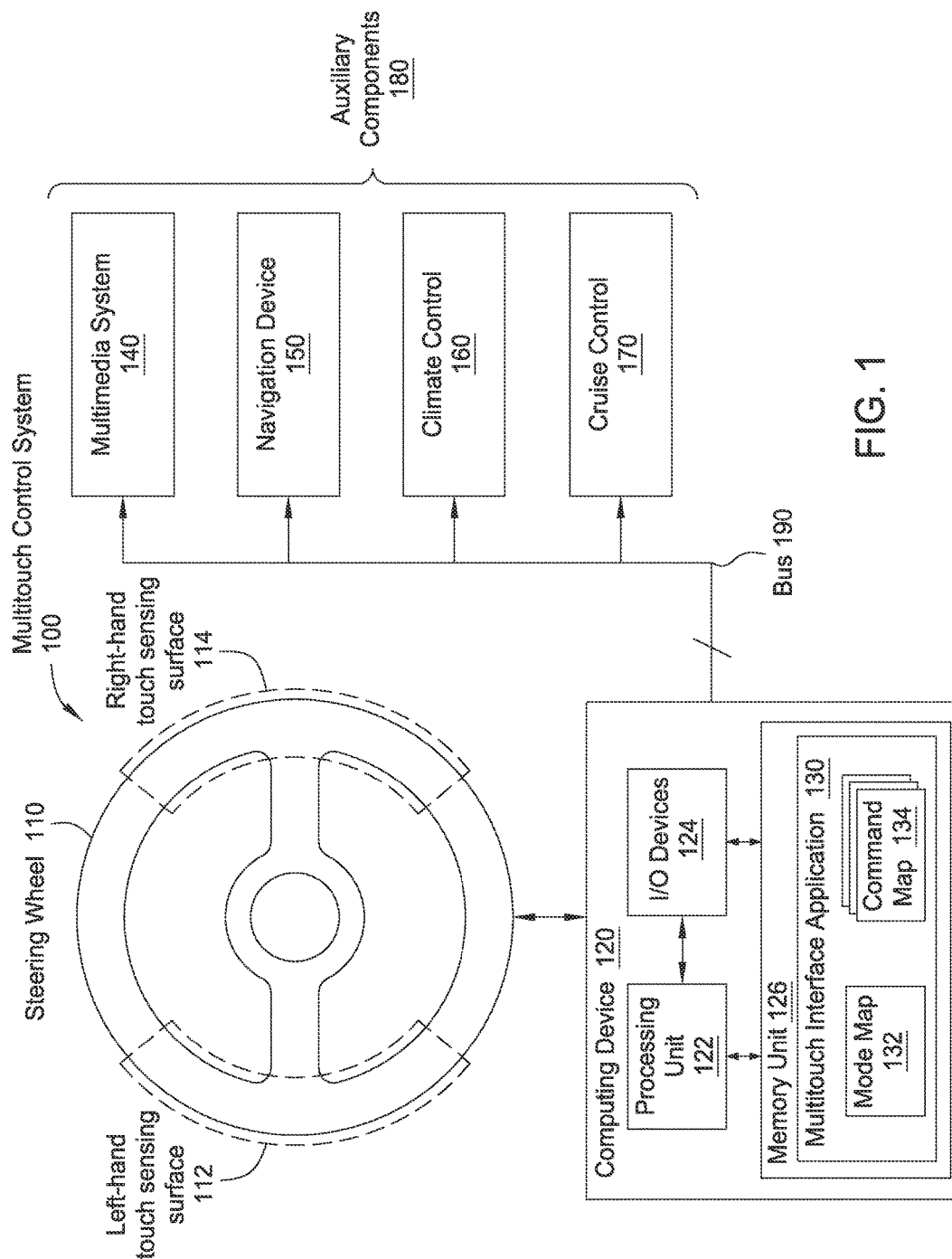
FIG. 1 illustrates a multitouch control system configured to control one or more auxiliary components within a vehicle, according to various embodiments.

FIG. 1 illustrates a multitouch control system 100 configured to control one or more auxiliary components 180 within a vehicle, according to various embodiments. As shown, multitouch control system 100 includes a steering wheel 110 coupled to a computing device 120 that, in turn, is coupled to a multimedia system 140, a navigation device 150, climate control 160, and cruise control 170, collectively referred to as auxiliary components 180.

Steering wheel 110 may be manipulated, in a conventional fashion, to control the direction of a vehicle (not shown) where multitouch control system 100 resides. Steering wheel 110 includes left-hand touch sensing surface 112 and right-hand touch sensing surface 114. Left-hand touch sensing surface 112 and right-hand touch sensing surface 114 are multitouch sensing surfaces that may rely on a wide variety of different possible types of sensing for detecting multiple simultaneous touch contacts, including, for example, and without limitation, resistive sensing, capacitive sensing, visual sensing, thermal sensing, ultrasonic sensing, infrared sensing, laser-based sensing, radar-based sensing, time-of-flight sensing and structured light-based sensors, and so forth.

Left-hand touch sensing surface 112 is configured so that a user of multitouch control system 100 (generally the driver of the vehicle) may input gestures to that touch sensing surface. As referred to herein, a "gesture" may be any single or multi-finger touch sensing surface interaction, including, for example, a single of multi-finger tap gesture, a single or multi-finger tap-and-hold gesture, a single or multi-finger tap-and-slide or swipe gesture, and so forth, without limitation.

Right-hand touch sensing surface 114 is configured similarly to left-hand touch sensing surface 112, i.e., the user of multitouch control system 100 may input gestures to that touch sensing surface. Left-hand touch sensing surface 112 and right-hand touch sensing surface 114 may be coupled to, or included within, steering wheel 110 according to a wide variety of different positions and/or orientations. Generally, those touch sensing surfaces are located to allow the user to input gestures without removing either hand from steering wheel 110, as described in greater detail below in conjunction with FIGS. 2A-2B.

A user of multitouch control system 100 inputs gestures into left-hand touch sensing surface 112 and right-hand touch sensing surface 114 in order to control the operation of multimedia system 140, navigation device 150, climate control 160, cruise control 170, and potentially other auxiliary components (not shown) beyond auxiliary components 180. Other auxiliary components could include, for example, a power window subsystem, a power locks subsystem, headlight controls, windshield wiper controls, traction or anti-slip settings, four-wheel drive controls, seat adjustment systems, interior lighting, a powered side and rear view mirror system, and so forth, without limitation. When the user inputs a left-hand gesture to left-hand touch sensing surface 112, computing device 120 interprets the left-hand gesture as a selection of a mode associated with a particular auxiliary component 180. If the user also inputs a right-hand gesture to right-hand touch sensing surface 114 at approximately the same time, computing device 120 interprets the right-hand gesture as a command to be issued to that auxiliary component.

For example, and without limitation, the user could input a single tap to left-hand touch sensing surface 112 to indicate the selection of a multimedia mode associated with multimedia system 140, and input an upward swipe to right-hand touch sensing surface 114 to indicate a volume increase for music currently being played by multimedia system 140. Computing device 120 is configured to receive and interpret a wide variety of different gestures from left-hand touch sensing surface 112 and right-hand touch sensing surface 114, as described below in conjunction with FIGS. 4A-4D.

Computing device 120 includes a processing unit 122, input/output (I/O) devices 124, and a memory unit 126, coupled together. Processing unit 122 may be any technically feasible unit configured to process data, including, for example, a central processing unit (CPU) or application-specific integrated circuit (ASIC), without limitation. I/O devices 124 include devices configured to receive input (such as, e.g., a set of buttons, without limitation) devices configured to deliver output (such as, e.g., a display screen, without limitation), as well as devices capable of both receiving input and delivering output (such as, e.g., a universal serial bus (USB) port, without limitation).

Memory unit 126 may be any technically feasible unit configured to store data and program code, including, for example, a random access memory (RAM) module or a hard disk, without limitation. Memory unit 126 includes a multitouch interface application 130 that, when executed by processing unit 122, issues commands to auxiliary components 180 in response to gestures received from left-hand touch sensing surface 112 and right-hand touch sensing surface 114. Multitouch interface application 130 includes a mode map 132 and a command map 134. Mode map 132 defines a mapping between left-hand gestures and modes associated with auxiliary components 180, while command map 134 includes a mapping between right-hand gestures and commands associated with those auxiliary components.

During execution by processing unit 122, multitouch interface application 130 receives gestures from left-hand touch sensing surface 112 and interprets those gestures, based on mode map 132, as selections of particular modes associated with an auxiliary component. Multitouch interface application 130 also receives gestures from right-hand touch sensing surface 114 and interprets those gestures, based on a selected mode and based on command map 134, as commands to be issued to the auxiliary component associated with the selected mode.

Different commands are relevant to different auxiliary components, and so multitouch interface application 130 may identify a specific subset of commands within command map 134 that correspond to the auxiliary component associated with the selected mode. As such, multitouch interface application 130 identifies a relevant portion of command map 134 upon receiving a selection of a mode (via a left-hand gesture), and then interprets a right-hand gesture based on the relevant portion of command map 134.

For example, and without limitation, suppose multitouch interface application 130 receives a single tap (left-hand gesture) and an upward swipe (right-hand gesture) at approximately the same time. Upon determining that the single tap indicates a selection of multimedia system 140, multitouch interface application 130 could then identify a subset of commands within command map 134 relevant to multimedia system 140. Then, multitouch interface application 130 could interpret the upward swipe as corresponding to a "volume increase" command based on the identified subset of command map 134. Multitouch interface application 130 could then issue a volume increase command to multimedia system 140 in order to increase the volume. An exemplary mapping between specific modes and specific portions of command map 134 is described in greater detail below in conjunction with FIG. 3.

With the approach described thus far, the user of multitouch control system 100 is capable of controlling the operation of a multitude of auxiliary components without removing either hand from steering wheel 110. Thus, control of the vehicle where multitouch control system 100 resides may be improved. In addition, since the user need not avert visual focus to auxiliary components, the user can maintain focus on driving. Although the present discussion is conducted towards arrangements where left-hand gestures correspond to mode selections and right-hand gestures correspond to commands, those having ordinary skill in the art will recognize that multitouch interface application 130 may also interpret right-hand gestures as corresponding to mode selections and left-hand gestures as corresponding to commands, and that the particular "handedness" of embodiments of the invention is immaterial.

Figure 2B:
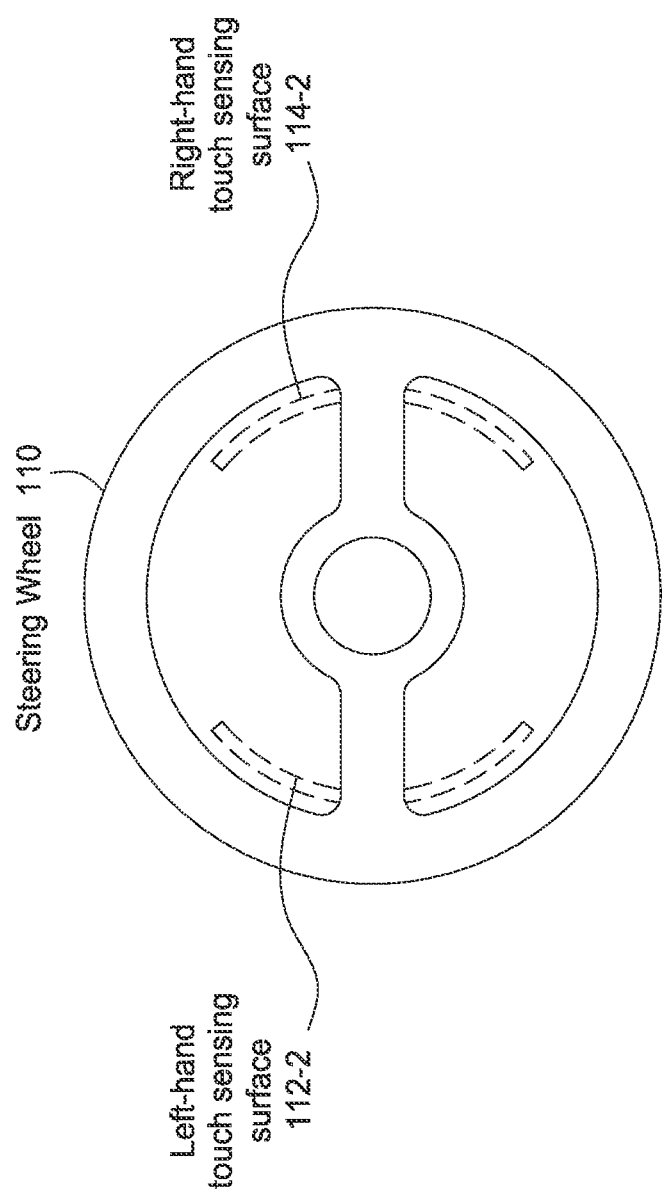

FIGS. 2A-2B illustrate exemplary configurations of left-hand touch sensing surface 112 and right-hand touch sensing surface 114 included within steering wheel 110, according to various embodiments. In FIG. 2A, steering wheel 110 includes left-hand touch sensing surface 112-1 and right-hand touch sensing surface 114-1 coupled to a central hub of steering wheel 110 and extending radially outwards. The user may extend their fingers slightly in order to input left-hand gestures and right-hand gestures to those touch sensing surfaces without removing either hand from steering wheel 110.

In FIG. 2B, steering wheel 110 includes left-hand touch sensing surface 112-2 and right-hand touch sensing surface 114-2 coupled to an inner surface of that steering wheel. With this configuration, the user need not extend their fingers to input gestures to those touch sensing surfaces, because nominally, the user grasps steering wheel 110 at the location of left-hand touch sensing surface 112 and right-hand touch sensing surface 114.

Referring generally to FIGS. 2A-2B, the configurations illustrated in those Figures are intended for exemplary purposes only, and not meant to limit the scope of the invention. Persons skilled in the art will understand that a wide variety of other configurations may also be implemented without departing from the general scope and spirit of the present invention. In addition, as a general matter, the techniques described herein are not limited to steering wheels and may be applicable to any type of bi-manual mechanism including, for example, and without limitation, handle bars (e.g., on motorcycles, all-terrain vehicles (ATVs), snow mobiles, jet skis, etc., without limitation), control yokes, cyclics and collectives (e.g., on airplanes and helicopters, etc., without limitation), other types of bi-manual control mechanisms, and any other type of mechanism that includes a different handle or hand position for each hand of the user.

In one embodiment, steering wheel 110 includes one or more touch sensing surfaces distributed around steering wheel 110, and multitouch interface application 130 interprets gesture inputs as corresponding to particular hands of the user regardless of the rotational state of steering wheel 110. In doing so, multitouch interface application 130 may be configured to establish "virtual sensing zones" that maintain specific positions despite rotation of steering wheel 110.

In doing so, multitouch interface application 130 may establish a left-hand virtual sensing zone that is generally associated with the left side of steering wheel 130 and remains associated with that left side when steering wheel 130 is rotated. Likewise, multitouch interface application 130 may establish a right-hand virtual sensing zone that is generally associated with the right side of steering wheel 130 and remains associated with that right side when steering wheel 130 is rotated. Upon receiving a set of gesture inputs via the one or more touch sensing surfaces associated with steering wheel 110, multitouch interface application 130 may identify the particular virtual sensing zone with which each gesture input should be associated by accounting for the rotational state of the steering wheel (e.g., via a rotary sensor, without limitation).

For example, and without limitation, when steering wheel 110 is in a non-rotated state (i.e., the user drives in a straight line), the left hand of the user could reside on a first portion of steering wheel 110 and the right hand of the user could resides on a second portion of steering wheel 110. However, if the user then rotates steering wheel 110 by 180 degrees, (i.e., the user drives along a curve), the first portion of steering wheel 110 and the second portion of steering wheel 110 would then exchange positions, and the left hand of the user would then reside on the second portion and the right hand of the user would then reside on the first portion.

However, by implementing virtual sensing zones, multitouch interface application 130 could interpret gesture inputs received from the left hand of the user as corresponding to the left-hand virtual sensing zone, regardless of the exact position of that left hand on steering wheel 110. Similarly, multitouch interface application 130 could interpret gesture inputs received from the right hand of the user as corresponding to the right-hand virtual sensing zone regardless of the exact position of that right hand on steering wheel 110. With this approach, multitouch interface application 130 may determine which hand of the user provided each gesture input regardless of where on steering wheel 130 that input was actually received, and then initiate action based on those gesture inputs in the fashion described above in conjunction with FIG. 1.

In another embodiment, multitouch interface application 130 may distinguish between a left-hand gesture input and a right-hand gesture input by analyzing received gesture inputs and/or analyzing other sensor data associated with the hands of the user. For example, multitouch interface application 130 could implement a palm scanner to associate a particular hand of the user with a specific gesture input. In another example, multitouch interface application 130 could perform a tracking operation to track the hands of the user, and then analyze tracking data to identify which hand provided each gesture input. The tracking operation could rely on visual tracking cameras, infrared camera, laser-based sensors, detection of one or more wearable devices worn by the user, and so forth, without limitation. With this approach, multitouch interface application 130 may distinguish between right-hand and left-hand gestures in situations where the hands of the user are crossed. In further embodiments, multitouch control system 100 may implement both virtual sensing zones and hand tracking operations, in a combination of the two previously mentioned embodiments.

Figure 3:
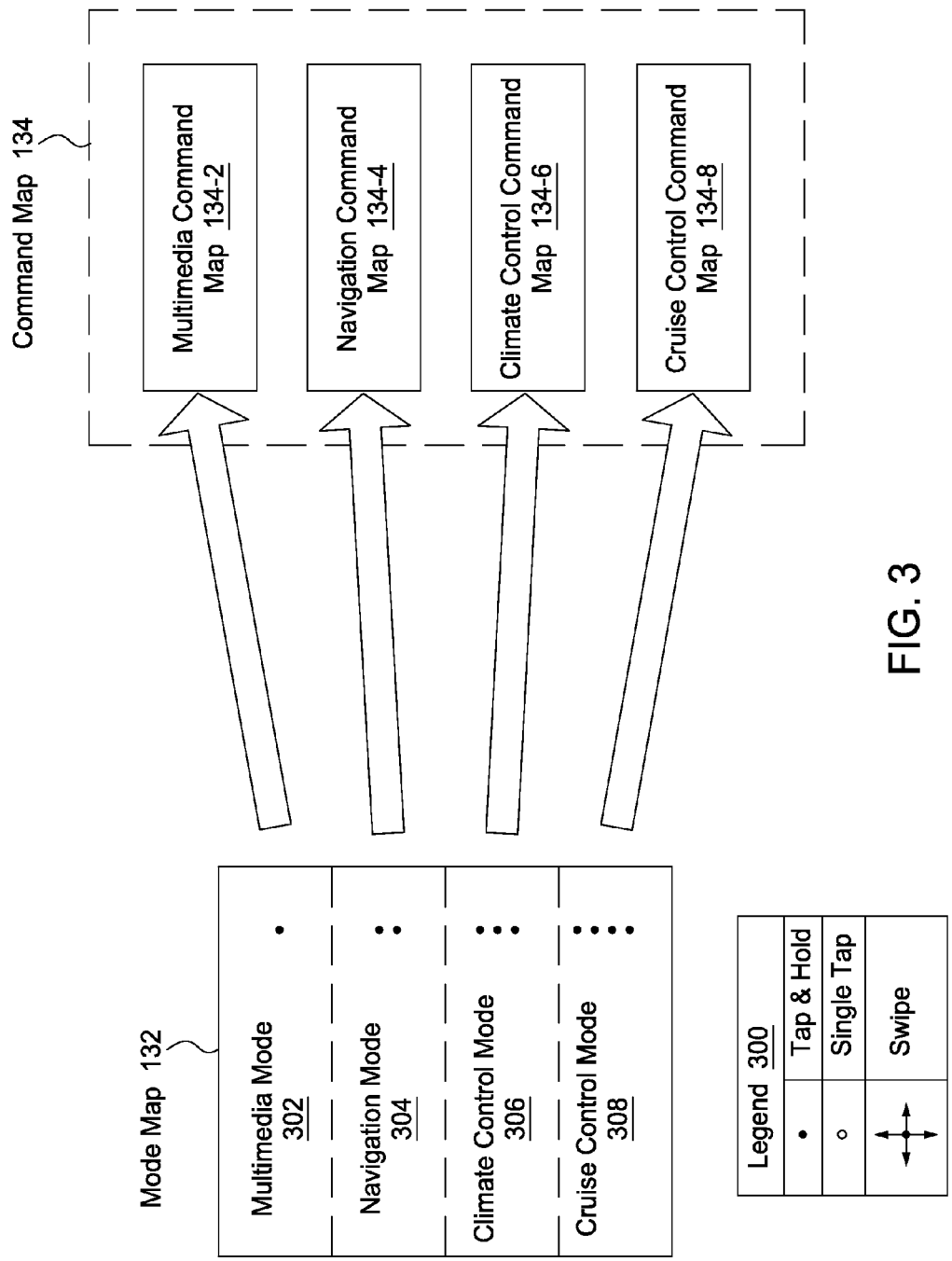
FIG. 3 illustrates a mode map for interpreting left-hand gestures and a command map for interpreting right-hand gestures, according to various embodiments.

FIG. 3 illustrates mode map 132 for interpreting left-hand gestures and command map 134 for interpreting right-hand gestures, according to various embodiments. Mode map 132 includes a collection of modes and corresponding left-hand gestures. The gestures included within mode map 132 may be understood based on legend 300. In particular, as is shown, multimedia mode 302 corresponds to a single-finger tap-and-hold gesture, navigation mode 304 corresponds to a two-finger tap-and-hold gesture, climate control mode 306 corresponds to a three-finger tap-and-hold gesture, and cruise control mode 308 corresponds to a four-finger tap-and-hold gesture. Multitouch interface application 130 shown in FIG. 1 may select any of the aforementioned modes when the corresponding left-hand gesture is received from left-hand touch screen 112. Again, the particular handedness discussed herein is provided for exemplary purposes only, and not meant to limit the scope of the invention.

Upon receiving a left-hand gesture from left-hand touch sensing surface 112 and mapping that gesture to a mode included in mode map 132, multitouch interface application 130 may then receive a right-hand gesture from right-hand touch sensing surface 114. Multitouch interface application 130 may interpret a particular right-hand gesture differently depending on the mode selected via the left-hand gesture. Specifically, when multimedia mode 302 is selected, multitouch interface application 130 interprets right-hand gestures based on multimedia command map 134-2. When navigation mode 304 is selected, multitouch interface application 130 interprets right-hand gestures based on navigation command map 134-4. When climate control mode 306 is selected, multitouch interface application 130 interprets right-hand gestures based on climate control command map 134-6. When cruise control mode 308 is selected, multitouch interface application 130 interprets right-hand gestures based on cruise control command map 134-8.

In the embodiment described above, multitouch interface application 130 may select a relevant command sub-map within command map 134 based on the currently selected mode, and then interpret right-hand gestures based on that relevant command sub-map. However, in other embodiments, multitouch interface application 130 may rely on separate and distinct command maps that each correspond to a different mode. Upon receipt of a particular mode selection via a left-hand gesture, multitouch interface application 130 may retrieve the appropriate command map needed to interpret right-hand gestures for that mode. Persons skilled in the art will recognize that a wide variety of different mappings between left-hand gestures and modes and right-hand gestures and commands are possible, beyond the specific embodiments described above. FIGS. 4A-4D, described in greater detail below, illustrate various exemplary scenarios where multitouch interface application 130 relies on the different command sub-maps shown in FIG. 3 for interpreting right-hand gestures.

FIGS. 4A-4D illustrate exemplary scenarios where multitouch interface application 130 within multitouch control system 100 interprets specific right-hand gestures differently, based on a currently selected mode, as different commands, according to various embodiments. In the following FIGS. 4A-4D, mode map 132 is associated with left-hand touch sensing surface 112 and multimedia command maps 134-2, 134-4, 134-6, and 134-8 may be associated with right-hand touch sensing surface 114. As a general matter, the position and orientation of these different maps, and the gestures indicated therein, is immaterial, and should not be interpreted as being relevant to the operation of multitouch control system 100 or multitouch interface application 130 included therein.

Specifically, the mapping between the different maps mentioned above (and included gesture inputs) and the corresponding touch sensing surfaces is a logical mapping, and should not be interpreted as a physical mapping. Similarly, the depictions of gesture inputs in these Figures are provided for illustrative purposes only, and are not meant to limit the physical configurations of gesture inputs that may be received. Importantly, although the exemplary touch contacts illustrated in FIGS. 4A-4B are shown as being aligned vertically, this alignment is not required, and multitouch interface application 130 may similarly interpret multiple touch contacts that are distributed or aligned in any possible fashion.

In addition, the techniques described in conjunction with FIGS. 4A-4D, while discussed relative to left-hand touch sensing surface 112 and right-hand touch sensing surface 114, are equally applicable when multitouch interface application 130 establishes the left-hand virtual sensing zone and right-hand virtual sensing zone described above in conjunction with FIGS. 2A-2B.

Figure 4A:
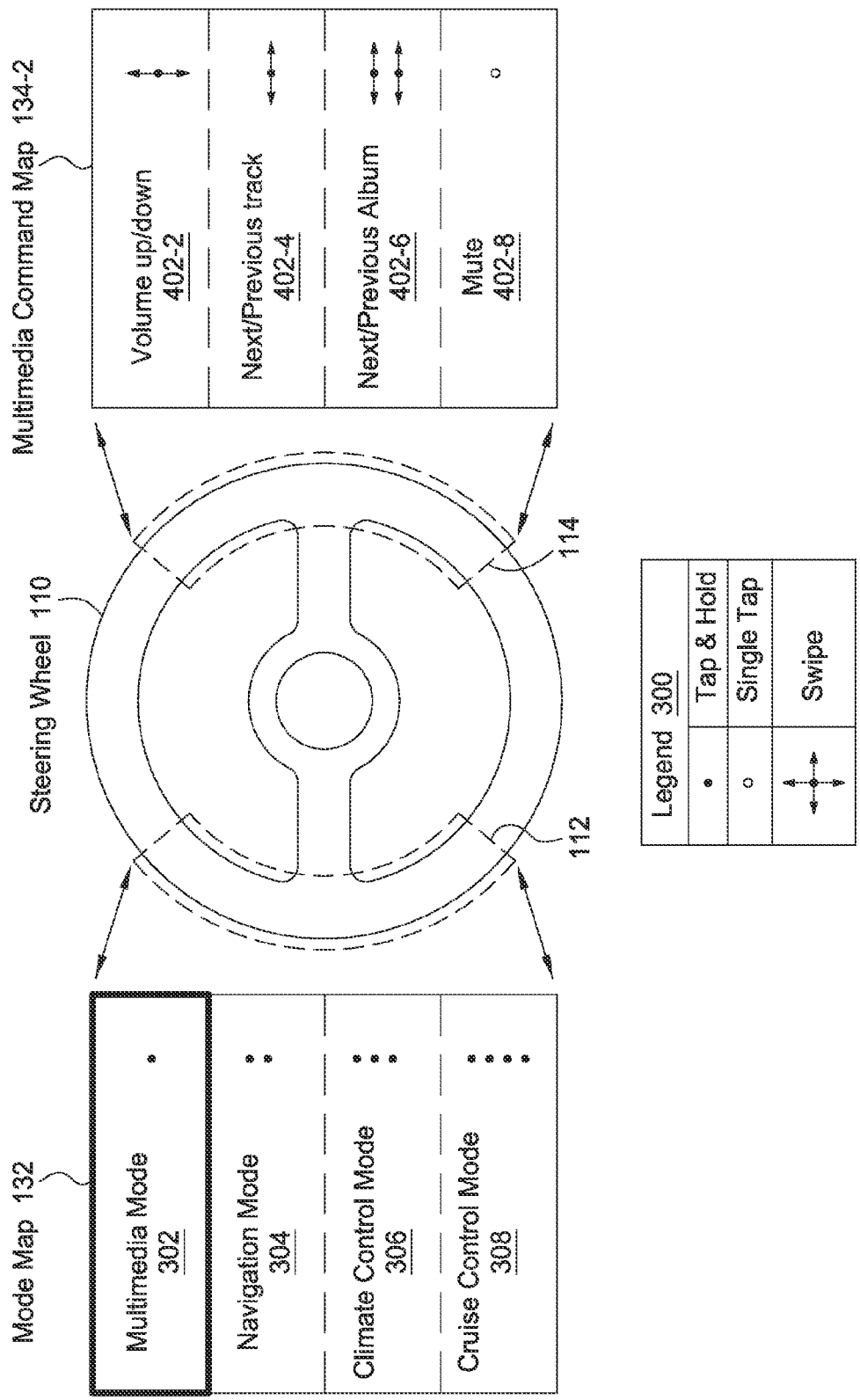
FIGS. 4A-4D illustrate exemplary scenarios where the multitouch control system of FIG. 1 interprets specific right-hand gestures differently, based on a currently selected mode, as different commands, according to various embodiments.
Figure 4B:
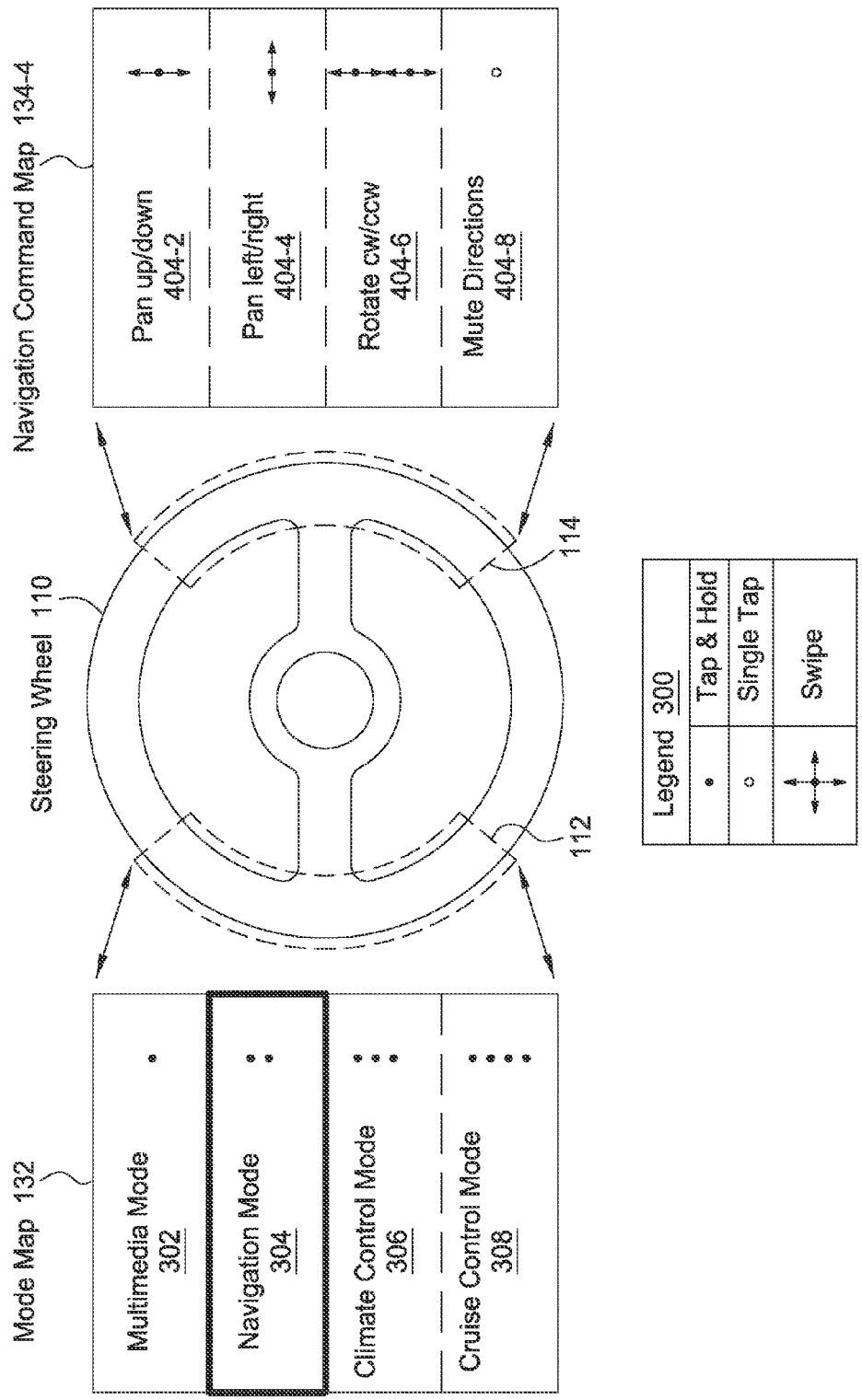

As shown in FIG. 4A, mode map 132 is associated with left-hand touch sensing surface 112. The user of multitouch control system 100 inputs a one-finger tap-and-hold gesture into left-hand touch sensing surface 112, which multitouch interface application 130 interprets, based on mode map 132, as corresponding to multimedia mode 302. When multimedia mode 302 selected, multitouch interface application 130 retrieves multimedia command map 134-2, which includes commands specific to multimedia system 140.

As also shown, multimedia command map 134-2 is associated with right-hand touch sensing surface 114 and includes a set of commands that may be issued to multimedia system 140 in order to cause that system to perform various operations. Those commands include volume up/down 402-2, next/previous track 402-4, next/previous album 402-6, and mute 402-8. The user of multitouch control system 100 may initiate a given operation by inputting the left-hand gesture corresponding to multimedia mode 302 in conjunction with inputting a right-hand gesture associated with the command corresponding to the desired operation.

For example, the user could increase or decrease the volume of multimedia system 140 by inputting a one-finger tap-and-hold gesture into left-hand touch sensing surface 112 and, at approximately the same time, inputting a one-finger upward or downward swipe gesture, respectively, into right-hand touch sensing surface 114, without limitation. In another example, the user could select the next track or previous track of an album multimedia system 140 is configured to play by inputting a one-finger tap-and-hold gesture into left-hand touch sensing surface 112 and, at approximately the same time, inputting a one-finger rightward or leftward swipe gesture, respectively, into right-hand touch sensing surface 114, without limitation.

In yet another example, the user could select the next album or previous album of a set of albums multimedia system 140 is configured to play by inputting a one-finger tap-and-hold gesture into left-hand touch sensing surface 112 and, at approximately the same time, inputting a two-finger rightward or leftward swipe gesture, respectively, into right-hand touch sensing surface 114, without limitation. In yet another example, the user could mute audio generated by multimedia system by inputting a one-finger tap-and-hold gesture into left-hand touch sensing surface 112 and, at approximately the same time, inputting a single tap gesture into right-hand touch sensing surface 114, without limitation.

Persons skilled in the art will understand that the functionality described above in conjunction with FIG. 4A is provided for exemplary purposes only, and is not meant to limit the scope of the invention. FIG. 4B, described below, illustrates other exemplary functionality of multitouch control system 100.

As shown in FIG. 4B, the user of multitouch control system 100 inputs a two-finger tap-and-hold gesture into left-hand touch sensing surface 112, which multitouch interface application 130 interprets, based on mode map 132, as corresponding to navigation mode 304. When navigation mode 304 is selected, multitouch interface application 130 retrieves navigation command map 134-4, which includes commands specific to navigation device 150.

As also shown, navigation command map 134-4 is associated with right-hand touch sensing surface 114 and includes a set of commands that may be issued to navigation device 150 in order to cause that device to perform various operations associated with vehicle navigation, including, without limitation, operations related to a navigation map. Those commands include pan up/down 404-2, pan left/right 404-4, rotate clockwise (CW)/counter-clockwise (CCW) 404-6, and mute directions 404-8. The user of multitouch control system 100 may initiate a given operation by inputting the left-hand gesture corresponding to navigation mode 304 in conjunction with inputting a right-hand gesture associated with the command corresponding to the desired operation.

For example, the user could pan the navigation map generated by navigation device 150 up or down by inputting a two-finger tap-and-hold gesture into left-hand touch sensing surface 112 and, at approximately the same time, inputting a one-finger upward or downward swipe gesture, respectively, into right-hand touch sensing surface 114, without limitation. In another example, the user could pan the navigation map left or right by inputting a two-finger tap-and-hold gesture into left-hand touch sensing surface 112 and, at approximately the same time, inputting a one-finger rightward or leftward swipe gesture, respectively, into right-hand touch sensing surface 114, without limitation.

In yet another example, the user could rotate the navigation map clockwise or counterclockwise by inputting a two-finger tap-and-hold gesture into left-hand touch sensing surface 112 and, at approximately the same time, inputting a two-finger upward or downward swipe gesture, respectively, into right-hand touch sensing surface 114, without limitation. In yet another example, the user could mute directions dictated by navigation device 150 by inputting a two-finger tap-and-hold gesture into left-hand touch sensing surface 112 and, at approximately the same time, inputting a one-finger tap gesture into right-hand touch sensing surface 114, without limitation.

Figure 4C:
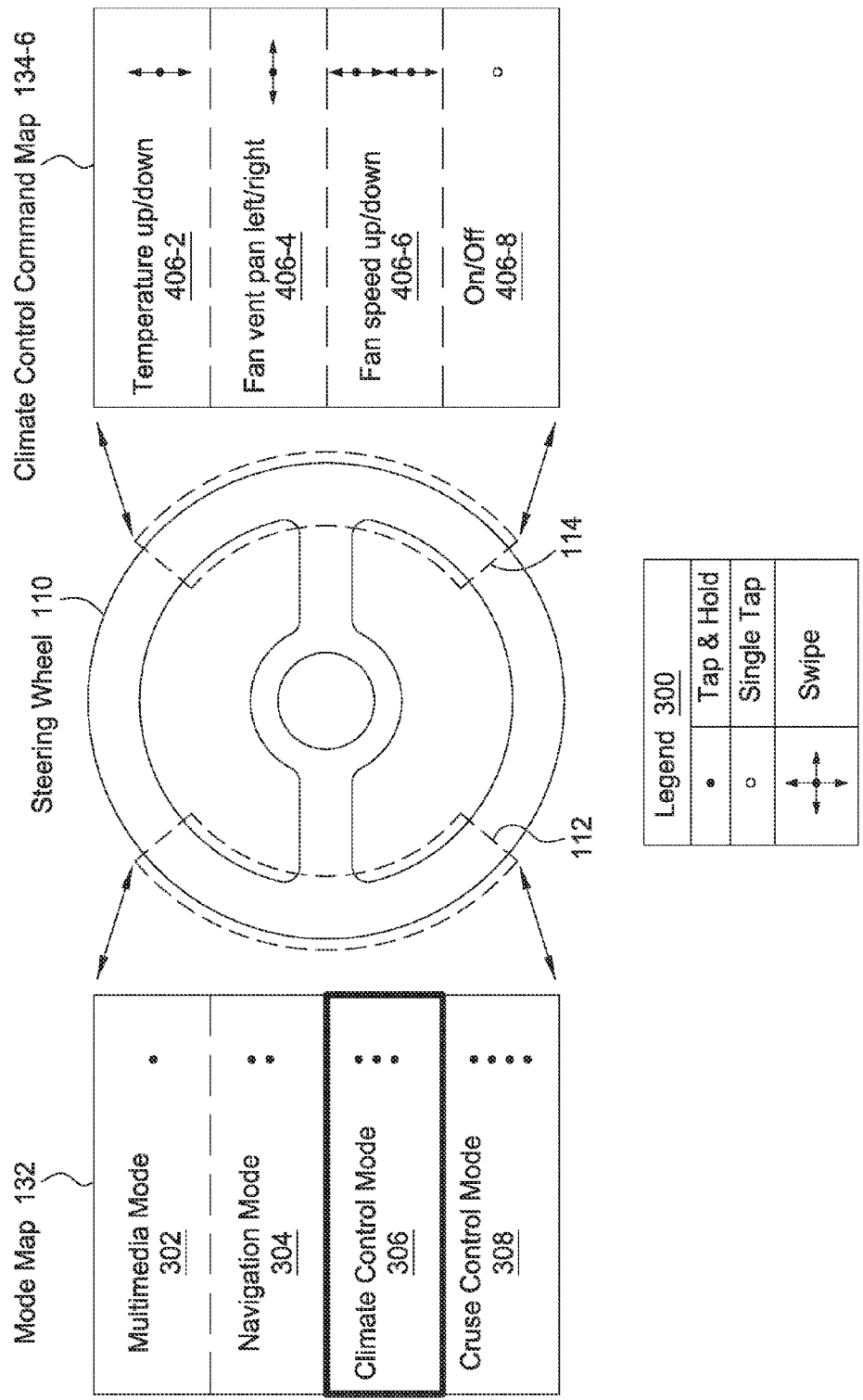

Persons skilled in the art will understand that the functionality described above in conjunction with FIG. 4B is provided for exemplary purposes only, and is not meant to limit the scope of the invention. FIG. 4C, described below, illustrates other exemplary functionality of multitouch control system 100.

As shown in FIG. 4C, the user of multitouch control system 100 inputs a three-finger tap-and-hold gesture into left-hand touch sensing surface 112, which multitouch interface application 130 interprets, based on mode map 132, as corresponding to climate control mode 306. When climate control mode 306 is selected, multitouch interface application 130 retrieves climate control command map 134-6, which includes commands specific to climate control 160.

As also shown, climate control command map 134-6 is associated with right-hand touch sensing surface 114 and includes a set of commands that may be issued to climate control 160 in order to effect climate changes within the cabin of the vehicle. Those commands include temperature up/down 406-2, fan vent pan left/right 406-4, fan speed up/down 406-6, and fan on/off 406-8. The user of multitouch control system 100 may initiate a given operation by inputting the left-hand gesture corresponding to climate control mode 306 in conjunction with inputting a right-hand gesture associated with the command corresponding to the desired operation.

For example, the user could increase or decrease the cabin temperature of the vehicle where multitouch control system 100 resides by inputting a three-finger tap-and-hold gesture into left-hand touch sensing surface 112 and, at approximately the same time, inputting a one-finger upward or downward swipe gesture, respectively, into right-hand touch sensing surface 114, without limitation. In another example, the user could reorient a fan vent within the vehicle to the left or right by inputting a three-finger tap-and-hold gesture into left-hand touch sensing surface 112 and, at approximately the same time, inputting a one-finger rightward or leftward swipe gesture, respectively, into right-hand touch sensing surface 114, without limitation.

In yet another example, the user could increase or decrease the speed of a fan within the vehicle by inputting a three-finger tap-and-hold gesture into left-hand touch sensing surface 112 and, at approximately the same time, inputting a two-finger upward or downward swipe gesture, respectively, into right-hand touch sensing surface 114, without limitation. In yet another example, the user could turn on and off fan of climate control 160 by inputting a three-finger tap-and-hold gesture into left-hand touch sensing surface 112 and, at approximately the same time, inputting a single tap gesture into right-hand touch sensing surface 114, without limitation.

Figure 4D:
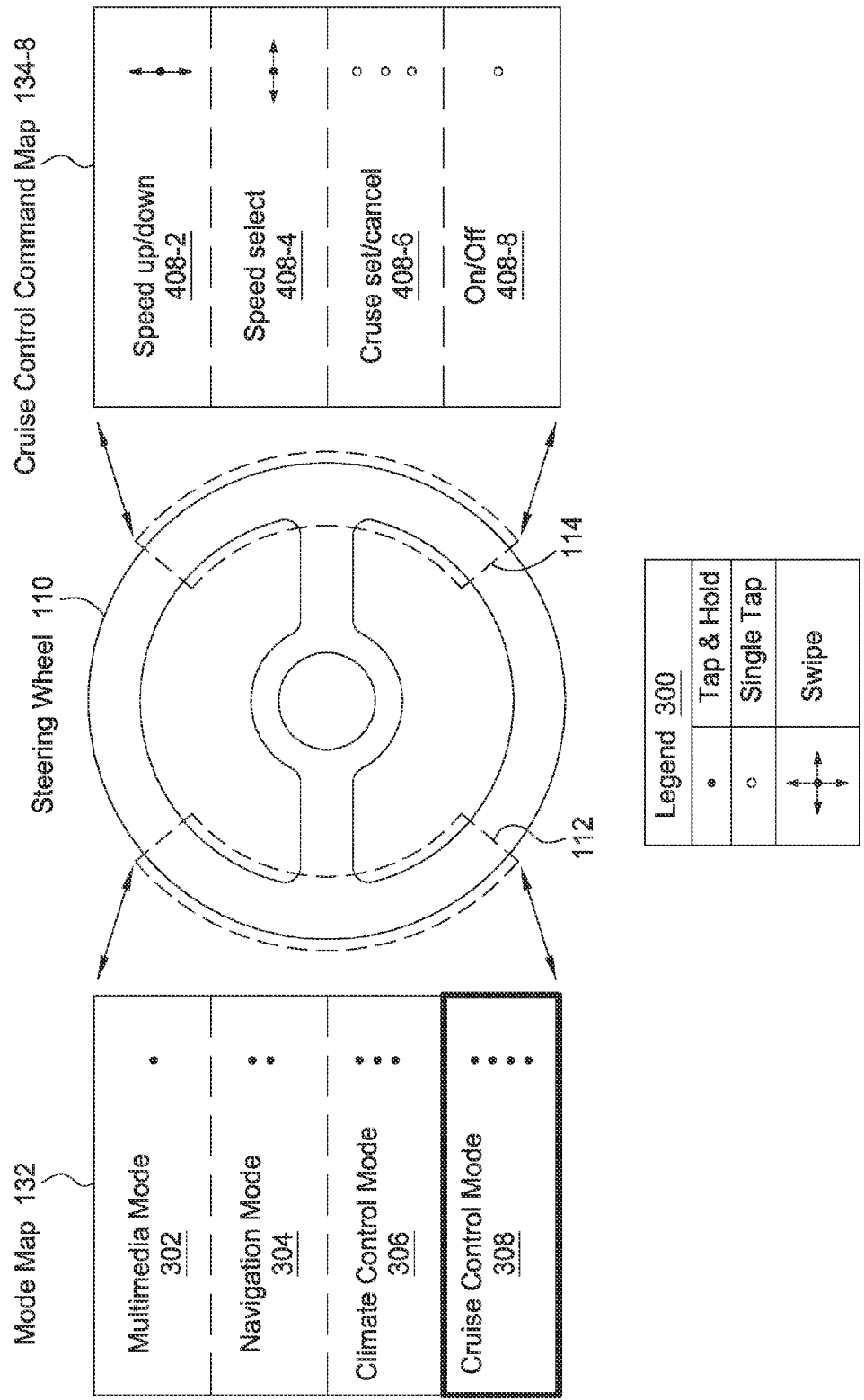

Persons skilled in the art will understand that the functionality described above in conjunction with FIG. 4C is provided for exemplary purposes only, and is not meant to limit the scope of the invention. FIG. 4D, described below, illustrates other exemplary functionality of multitouch control system 100.

As shown in FIG. 4D, the user of multitouch control system 100 inputs a four-finger tap-and-hold gesture into left-hand touch sensing surface 112, which multitouch interface application 130 interprets, based on mode map 132, as corresponding to cruise control mode 308. When cruise control mode 308 is selected, multitouch interface application 130 retrieves cruise control command map 134-8, which includes commands specific to cruise control 170.

As also shown, cruise control command map 134-8 is associated with right-hand touch sensing surface 114 and includes a set of commands that may be issued to cruise control 170 in order to change cruise control settings of the vehicle. Those commands include speed up/down 408-2, speed select 408-4, cruise set/cancel 408-6, and on/off 408-8. The user of multitouch control system 100 may initiate a given operation by inputting the left-hand gesture corresponding to cruise control mode 308 in conjunction with inputting a right-hand gesture associated with the command corresponding to the desired operation.

For example, the user could increase or decrease the speed of the vehicle where multitouch control system 100 resides by inputting a four-finger tap-and-hold gesture into left-hand touch sensing surface 112 and, at approximately the same time, inputting a one-finger upward or downward swipe gesture, respectively, into right-hand touch sensing surface 114, without limitation. In another example, the user could select a specific speed for the vehicle (e.g. from a set of menu options, without limitation) by inputting a four-finger tap-and-hold gesture into left-hand touch sensing surface 112 and, at approximately the same time, inputting a one-finger rightward or leftward swipe gesture into right-hand touch sensing surface 114 to select a given speed, without limitation.

In yet another example, the user could set or cancel cruise control for the vehicle by inputting a four-finger tap-and-hold gesture into left-hand touch sensing surface 112 and, at approximately the same time, inputting a three-finger tap gesture into right-hand touch sensing surface 114, without limitation. In yet another example, the user could turn cruise control 170 on or off by inputting a four-finger tap-and-hold gesture into left-hand touch sensing surface 112 and, at approximately the same time, inputting a single tap gesture into right-hand touch sensing surface 114, without limitation.

Referring generally to FIGS. 4A-4D, persons skilled in the art will understand that the examples described above in conjunction with those Figures are provided for illustrative purposes only, and are not meant to limit the scope of the invention. As a general matter, the functionality of multitouch control system 100 may be implemented using any type of gesture language that defines mode-related gestures associated with one touch sensing surface and command-related gestures associated with another touch sensing surface, where those command-related gestures correspond to a currently selected mode. In addition, persons skilled in the art will also recognize that the handedness of the examples discussed herein is selected for illustrative purposes only, and may be transposed in various embodiments.

In further embodiments, multitouch interface application 130 may receive a single gesture input and interpret the number of touch contacts (corresponding to the number of fingers used to input the gesture) as a selection of a mode. Multitouch interface application 130 may then interpret the gesture, based on the selected mode, as a command relevant to that mode. For example, and without limitation, the user could input a three-finger upward swipe into one of the touch sensing surfaces within multitouch control system 100, and multitouch interface application 130 would interpret the three-finger contact as a selection of climate control mode 306 and interpret the upward swipe as specifying a temperature increase for climate control 170. In another example, and without limitation, the user could input a two-finger tap into one of the touch sensing surfaces within multitouch control system 100, and multitouch interface application 130 would interpret the two-finger tap as a selection of navigation mode 304, and then further interpret that two-finger tap as a command to generate a route to a favorite location.

Figure 5:
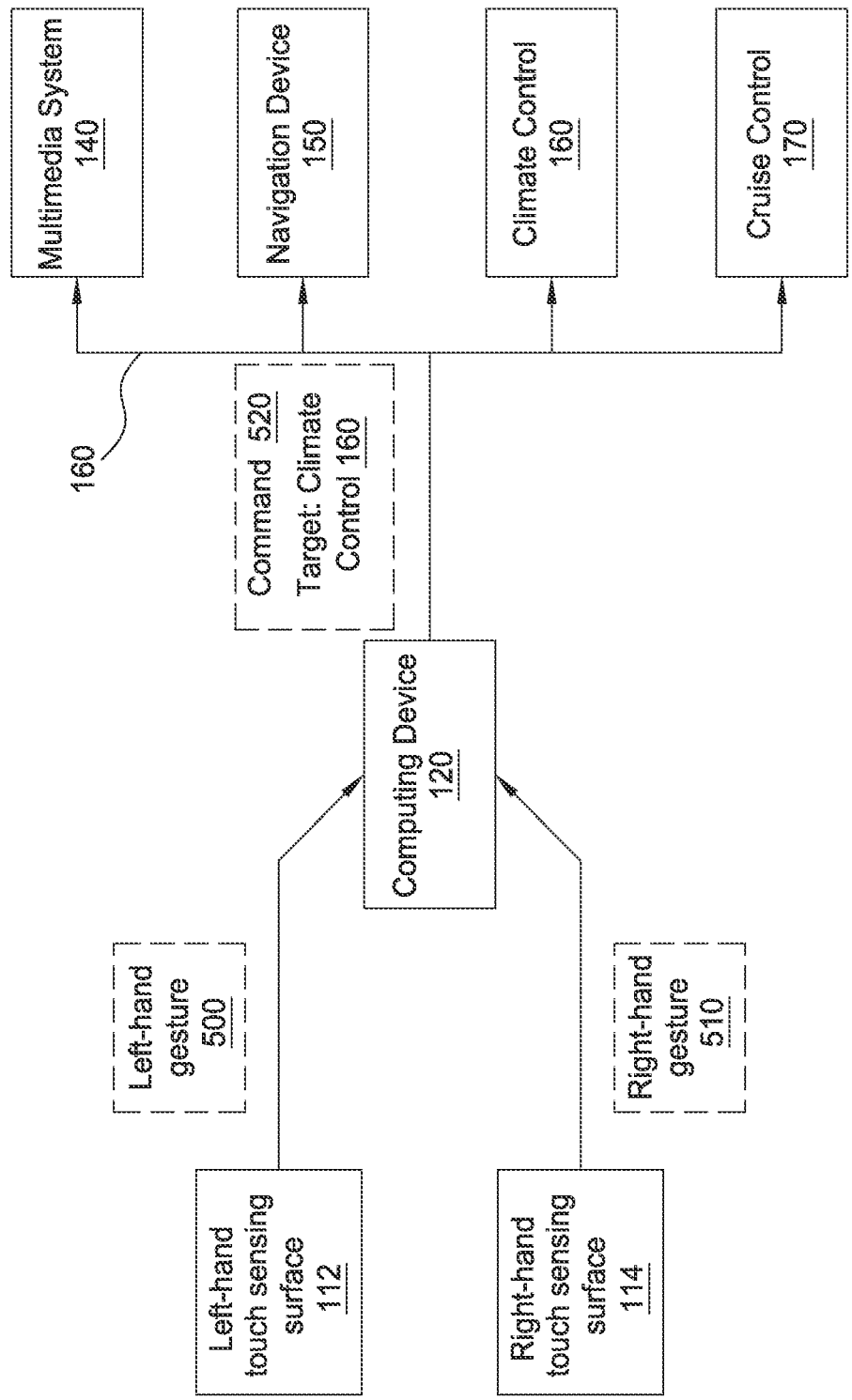
FIG. 5 illustrates data and processing elements associated with the multitouch control system of FIG. 1, according to various embodiments.

FIG. 5 illustrates data and processing stages associated with multitouch control system 100 of FIG. 1, according to various embodiments. As shown, computing device 120 is configured to receive a left-hand gesture 500 from left-hand touch sensing surface 112 and receive a right-hand gesture 510 from right-hand touch sensing surface 114. The user of multitouch control system 100 may input left-hand gesture 500 and right-hand gesture 510 at approximately the same time, or those gestures may be input at different times, although generally, those gestures should arrive at computing device 120 within a preset interval of time. Computing device 120 implements the preset interval of time so that erroneous gestures input to just one of left-hand touch sensing surface 112 and right-hand touch sensing surface 114 do not initiate unwanted auxiliary component operations. Accordingly, computing device 120 is configured to buffer gestures received from left-hand touch sensing surface 112 or right-hand touch sensing surface 114 for at least the preset interval of time until another gesture arrives.

In practice, when left-hand gesture 500 is received, computing device 120 translates that gesture, based on mode map 132, into a selection of a mode associated with a particular auxiliary component 180. Computing device 130 may also retrieve a specific command sub-map based on the selected mode, such as, e.g. multimedia command map 134-2 or navigation map 134-4, without limitation. When right hand gesture 510 is received, computing device 120 determines whether right-hand gesture 510 arrived within the preset interval of time relative to left-hand gesture 500. If right-hand gesture 510 arrives within the preset interval of time, then computing device 120 translates right-hand gesture 510, based on the selected command sub-map, into a command 520 that targets a specific auxiliary component 180. Computing device 120 then issues command 520 to that target component. In FIG. 5, command 520 is shown, for exemplary purposes, as targeting climate control 160, although command 520 may target any auxiliary component 180 depending on the selected mode.

Persons skilled in the art will understand that left-hand gesture 500 may arrive at computing device 120 before right-hand gesture 510 or after right-hand gesture 510. As mentioned, computing device 120 buffers any received gestures until another gesture arrives, provided the preset interval of time has not elapsed, and so the ordering of gestures is unimportant. Should right-hand gesture 510 arrive before left-hand gesture 500, computing device 120 simply buffers right-hand-gesture for the preset interval of time, and, if left-hand gesture 500 arrives within the preset interval, computing device 120 then identifies the selected mode and relevant command in like fashion as described above. The functionality of multitouch control system 100 described thus far is also described, in stepwise fashion, below in conjunction with FIG. 6.

Figure 6:
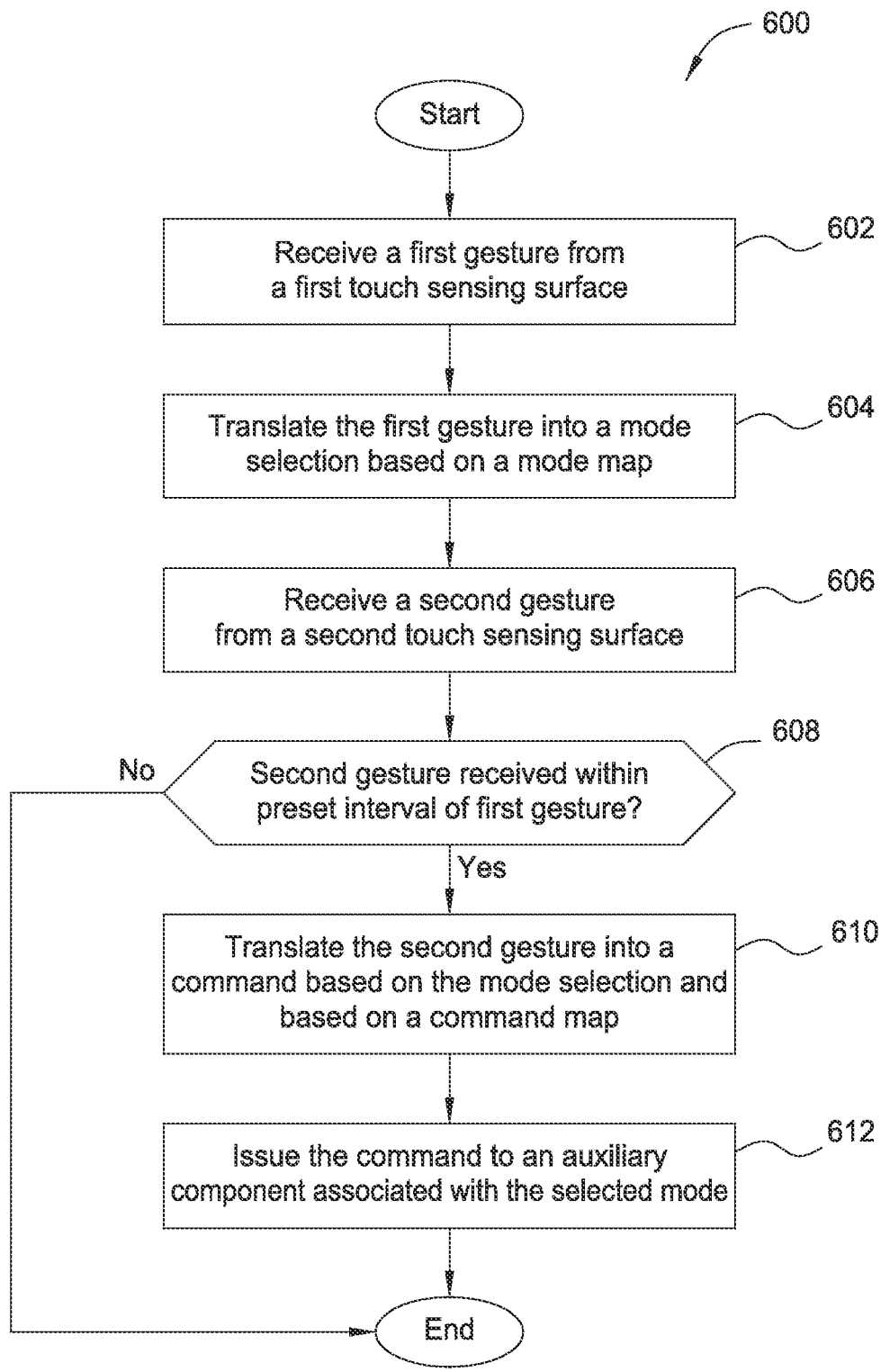
FIG. 6 is a flow diagram of method steps for controlling an auxiliary component within a vehicle using a multitouch chording language, according to various embodiments.

FIG. 6 is a flow diagram of method steps for controlling an auxiliary component within a vehicle using a multitouch chording language, according to various embodiments. Although the method steps are described in conjunction with the systems of FIGS. 1-5, persons skilled in the art will understand that any system configured to perform the method steps, in any order, is within the scope of the present invention.

As shown, a method 600 begins at step 602, where multitouch interface application 130, executing on computing device 120 within multitouch control system 100, receives a first input gesture from a first touch sensing surface. The first touch screen could be, for example, either of left-hand touch sensing surface 112 and right-hand touch sensing surface 114, although in a typical implementation where the driver sits on the left side of the vehicle, the first touch sensing surface would be left-hand touch sensing surface 112, without limitation. The first input gesture could be any identifiable touch input, including, for example, a single or multi-finger tap, tap-and-hold, swipe, etc., without limitation.

At step 604, multitouch interface application 130 translates the first input gesture into a mode selection based on a mode map, such as, e.g., mode map 132, without limitation. The mode map includes a mapping between gestures and mode selections, where each possible selection of mode corresponds to a different one of auxiliary components 180.

At step 606, multitouch interface application 130 receives a second input gesture from a second touch sensing surface. As with the first touch sensing surface, the second touch screen could be, e.g., either of left-hand touch sensing surface 112 and right-hand touch sensing surface 114. However, in a typical implementation where the driver sits on the left side of the vehicle, the second touch sensing surface would be right-hand touch sensing surface 114, without limitation. Like the first input gesture, the second input gesture could be any identifiable touch input, including, for example, a single or multi-finger tap, tap-and-hold, swipe, etc., without limitation.

At step 608, multitouch interface application 130 determines whether the second input gesture was received within a preset interval of the first input gesture. Multitouch interface application 130 implements the preset interval so that spurious gestures received individually into either the first or second touch sensing surface may be ignored, and only gestures received into both the first and second touch sensing surfaces in conjunction with one another, within the preset interval, are processed by multitouch interface application 130. The preset interval may be configured based on, e.g., user preferences, without limitation. If multitouch interface application 130 determines that the first and second input gestures were not received within the preset interval of one another, then the method 600 ends. Alternatively, if multitouch interface application 130 determines that the first and second input gestures were, in fact, received within the preset interval of one another, then the method 600 proceeds to step 610.

At step 610, multitouch interface application 130 translates the second input gesture into a command based on the mode selected at step 604 and based on a command map, such as, e.g., command map 134, without limitation. In doing so, multitouch interface application 130 may identify a command sub-map within the command map. The command sub-map may include a mapping between gestures and a subset of commands specific to the auxiliary component 180 associated with the selected mode.

At step 612, multitouch interface application 130 issues the command to the auxiliary component associated with the selected mode. The method 600 then ends. Persons skilled in the art will recognize that the method 600 may be implemented repeatedly to process gestures received from the first and second touch sensing surfaces.

In sum, a multitouch interface application provides a user with access to a multitouch chording language for controlling auxiliary components within a vehicle, where a particular command for a given auxiliary component is specified by a combination of a left-hand gesture and a right-hand gesture. The multitouch interface application receives left-hand gestures from a left-hand touch sensing surface, where a given left-hand gesture corresponds to a selection of mode associated within a given auxiliary component. The multitouch interface application also receives right-hand gestures from a right-hand touch sensing surface, where a given right-hand gesture, in conjunction with a left-hand gesture, corresponds to a command for the given auxiliary component. Upon receiving both a left-hand gesture and a right-hand gesture at approximately the same time, the multitouch interface application issues the command to the auxiliary component associated with the selected mode.

At least one advantage of the techniques set forth herein is that the driver of a vehicle that implements the multitouch interface application need not remove either hand from the steering wheel in order to adjust the operation of auxiliary components within the vehicle, thereby improving driver safety. In addition, the driver can interact with multitouch interface application without averting visual focus, further improving driver safety. With these techniques, vehicle accidents due to driver distraction may be reduced.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A non-transitory computer-readable medium storing program instructions that, when executed by a processor, cause the processor to control the operation of a plurality of auxiliary components within a vehicle, by performing the steps of:
   receiving, via a first touch sensing surface, a first input gesture;
   translating, based on a mode map, the first input gesture into a selection of a first mode corresponding to a first auxiliary component included in the plurality of auxiliary components, wherein the mode map provides a translation of input gestures into different modes, and each mode corresponds to a different auxiliary component included in the plurality of auxiliary components;
   in response, identifying a first command map associated with the first mode and corresponding to the first auxiliary component, wherein the first command map provides a translation of input gestures into different commands that control the operation of the first auxiliary component;
   receiving, via a second touch sensing surface, a second input gesture;
   translating, in accordance with the first command map, the second input gesture into a first command that relates to the operation of the first auxiliary component; and
   causing the first command to be transmitted to the first auxiliary component.

2. The non-transitory computer-readable medium of claim 1, wherein the mode map indicates, for each different input gesture in a first set of input gestures, a different auxiliary component in the plurality of auxiliary components.

3. The non-transitory computer-readable medium of claim 1,
   wherein the first command map includes commands specific to the first auxiliary component included in the plurality of auxiliary components, and
   wherein the first command map comprises a command sub-map that is identified within a command map that includes a plurality of command sub-maps, each different command sub-map in the plurality of command sub-maps including commands specific to a different auxiliary component included in the plurality of auxiliary components.

4. The non-transitory computer-readable medium of claim 1, wherein the second input gesture is received at substantially the same time as the first input gesture.

5. The non-transitory computer-readable medium of claim 1, further comprising the step of determining that the time between when first input gesture is received and when the second input gesture input is received falls within a preset time interval.

6. The non-transitory computer-readable medium of claim 1, wherein both the first touch sensing surface and the second touch sensing surface are coupled to a steering wheel that resides within the vehicle.

7. The non-transitory computer-readable medium of claim 1, wherein each of the first input gesture and the second input gesture comprises a single or multi-finger tap gesture, tap-and-hold gesture, or swipe gesture.

8. The non-transitory computer-readable medium of claim 1, wherein the plurality of auxiliary components within the vehicle includes at least two of a multimedia system, a navigation device, a climate control, a cruise control, a power window subsystem, a power locks subsystem, a headlight control, a windshield wiper control, a traction or anti-slip control, a four-wheel drive control, a seat adjustment system, a powered side and rear view mirror system, and an interior lighting control.

9. The non-transitory computer-readable medium of claim 1, wherein the first command map is included in a plurality of command maps, and each command map included in the plurality of command maps provides a translation of input gestures into different commands that control the operation of a different auxiliary component.

10. A computer-implemented method for controlling the operation of a plurality of auxiliary components within a vehicle, the method comprising:
receiving, via a first touch sensing surface, a first input gesture;
translating, based on a mode map, the first input gesture into a selection of a first mode corresponding to a first auxiliary component included in the plurality of auxiliary components, wherein the mode map provides a translation of input gestures into different modes, and each mode corresponds to a different auxiliary component included in the plurality of auxiliary components;
in response, identifying a first command map associated with the first mode and corresponding to the first auxiliary component, wherein the first command map provides a translation of input gestures into different commands that control the operation of the first auxiliary component;
receiving, via a second touch sensing surface, a second input gesture;
translating, in accordance with the first command map, the second input gesture into a first command that relates to the operation of the first auxiliary component; and
causing the first command to be transmitted to the first auxiliary component.

11. The computer-implemented method of claim 10, wherein the mode map indicates, for each different input gesture in a first set of input gestures, a different auxiliary component in the plurality of auxiliary components.

12. The computer-implemented method of claim 11,
wherein the first command map indicates, for each different input gesture in a second set of input gestures, a different command, and
wherein the first command map provides a translation for a subset of commands included in a plurality of subsets of commands, each different subset of commands corresponding to a different input gesture in the first set of input gestures and including commands specific to a different auxiliary component in the plurality of auxiliary components.

13. The computer-implemented method of claim 10, wherein the second input gesture is received before the first input gesture, and further comprising buffering the second input for a preset time interval.

14. The computer-implemented method of claim 10, further comprising determining that the time between when first input gesture is received and when the second input gesture input is received falls within a configurable time interval.

15. The computer-implemented method of claim 10, wherein both the first touch sensing surface and the second touch sensing surface are integrated into a steering wheel that resides within the vehicle.

16. The computer-implemented method of claim 10, further comprising:
receiving a third input gesture;
interpreting a number of touch contacts associated with the third input gesture as a selection of a second mode corresponding to a second auxiliary component in the plurality of auxiliary components; and
interpreting a duration associated with the third gesture or a directionality associated with the third gesture as a second command, wherein the second command is transmitted to the second auxiliary component.

17. The computer-implemented method of claim 10, wherein the plurality of auxiliary components within the vehicle includes at least two of a multimedia system, a navigation device, a climate control, a cruise control, a power window subsystem, a power locks subsystem, a headlight control, a windshield wiper control, a traction or anti-slip control, a four-wheel drive control, a seat adjustment system, a powered side and rear view mirror system, and an interior lighting control.

18. A system for controlling the operation of a plurality of auxiliary components within a vehicle, comprising:
a first touch sensing surface;
a second touch sensing surface; and
a computing device, comprising:
a processor configured to:
receive, via the first touch sensing surface, a first input gesture,
translate, based on a mode map, the first input gesture into a selection of a first mode corresponding to a first auxiliary component included in the plurality of auxiliary components, wherein the mode map provides a translation of input gestures into different modes, and each mode corresponds to a different auxiliary component included in the plurality of auxiliary components,
in response, identify a first command map associated with the first mode and corresponding to the first auxiliary component, wherein the first command map provides a translation of input gestures into different commands that control the operation of the first auxiliary component,
receive, via the second touch sensing surface, a second input gesture,
translate, in accordance with the first command map, the second input gesture into a first command that relates to the operation of the first auxiliary component, and
cause the first command to be transmitted to the first auxiliary component.

19. The system of claim 18, wherein the input received via the first touch sensing surface and the second touch sensing surface comprises a first gesture input that indicates the first auxiliary component and a second gesture input that indicates a subset of commands in the plurality of commands, respectively.

20. The system of claim 19, wherein the processing unit is further configured to identify the first command within the subset of commands based on the first gesture input.

21. The system of claim 18, wherein the first touch sensing surface is coupled to a steering wheel within the vehicle and positioned proximate to a first hand of a driver of the vehicle, and the second touch sensing surface is also coupled to the steering wheel and positioned proximate to a second hand of the driver of the vehicle.

* * * * *